Oct. 28, 1969  C. E. HEIDLAND  3,474,483
TRASH PICKER

Filed March 13, 1967  10 Sheets-Sheet 1

Carl E. Heidland
INVENTOR.

BY Pamela O. Wyatt
ATTORNEY

Oct. 28, 1969

C. E. HEIDLAND

3,474,483

TRASH PICKER

Filed March 13, 1967

Carl E. Heidland
INVENTOR.

BY *Rameles O. Wyatt*

ATTORNEY

Oct. 28, 1969  C. E. HEIDLAND  3,474,483
TRASH PICKER
Filed March 13, 1967  10 Sheets-Sheet 4

Carl E. Heidland
INVENTOR.

BY Ranseler O. Wyatt
ATTORNEY

Oct. 28, 1969 C. E. HEIDLAND 3,474,483
TRASH PICKER
Filed March 13, 1967 10 Sheets-Sheet 5

Carl E. Heidland
INVENTOR.
BY Pamela O Wyatt
ATTORNEY

Carl E. Heidland
INVENTOR.

BY Ranselen O Wyatt

ATTORNEY

Oct. 28, 1969  C. E. HEIDLAND  3,474,483
TRASH PICKER

Filed March 13, 1967  10 Sheets-Sheet 10

Carl E. Heidland
INVENTOR.

BY
ATTORNEY

United States Patent Office 3,474,483
Patented Oct. 28, 1969

3,474,483
TRASH PICKER
Carl E. Heidland, P.O. Box 134,
South Houston, Tex. 77587
Filed Mar. 13, 1967, Ser. No. 622,533
Int. Cl. E01h *1/08;* A47l *9/00*
U.S. Cl. 15—319
1 Claim

ABSTRACT OF THE DISCLOSURE

A vehicular device for cleaning streets and esplanades of the usual trash, having a vacuum picking head that will elevate, rotate and move laterally and may be tilted, maintained in a set position or permitted to automatically adjust itself to the contour of the area being cleaned, the picking head of the device being movable laterally, relative to the carrying vehicle, and having means therein for loosening packed debris, and means for guiding the picking head along the curb of a street and advising the operator of the proximity of such curb and being adapted for movement over rough terrain, having means for automatically moving the head away from a potentially dangerous obstruction and returning said head to its preselected operating position after the obstacle has been passed.

BACKGROUND OF THE INVENTION

Street cleaning devices having vacuum powered picking heads have been employed for many years, however, these devices are limited in their use, usually being capable only of removing light debris and cleaning only the paved surface of the roadway, or the like, and are restricted to the path of the vehicle carrying the picking mechanism for the cleaning operation. No provision is made for operating the vehicle on the roadway and cleaning the esplanades or the shoulders of the roadway. The present day use of the highways and the many highways available for use, have created a problem of how to maintain these highways free of debris likely to cause damage in high speed traffic, and detracting from the appearance of the roadway and its esplanades or shoulders.

SUMMARY OF THE INVENTION

A trash picker having a vacuum head movable in transverse relation to the truck, and being rotatable, elevatable and tiltable, having means for automatically moving the head out of the way of obstacles encountered and for returning the head to the original operating position after an obstacle has been cleared and being formed to selectively clean paving areas, as well as esplanades and shoulders from either side of the vehicle.

DESCRIPTION OF THE PREFERRED EMBODIMENT

Figure 1:
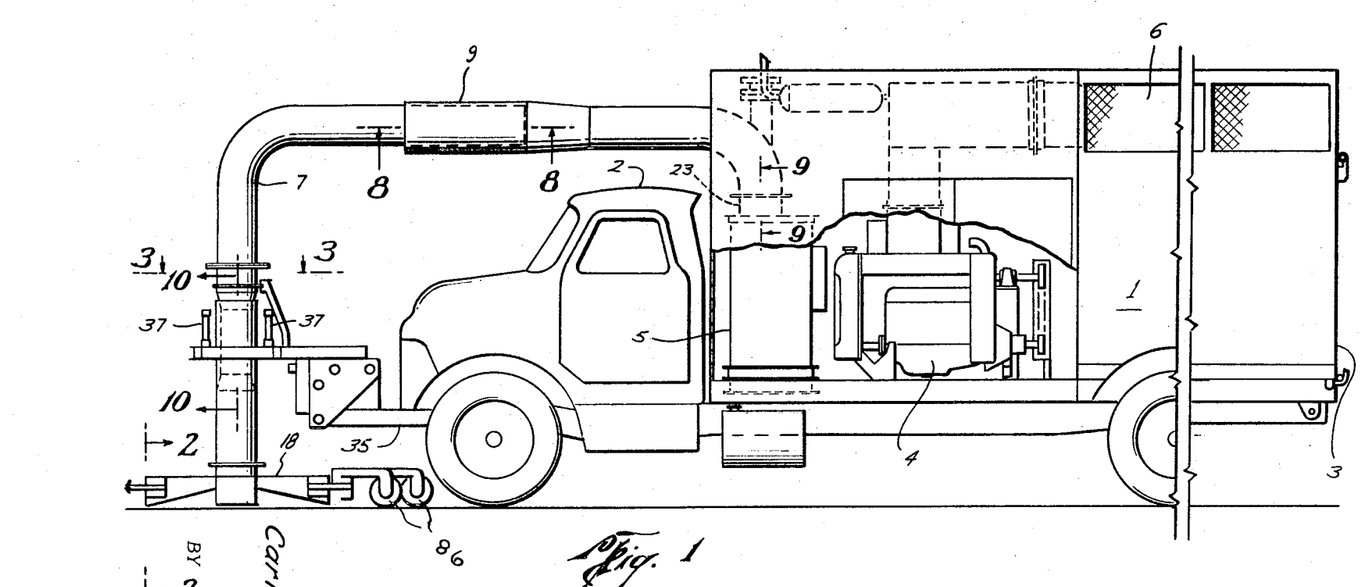
FIGURE 1 is a side elevational view of the trash picker.
Figure 2:
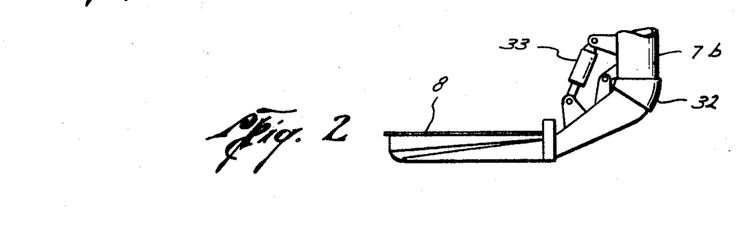
FIGURE 2 is an enlarged fragmentary view of the picker head.
Figure 3:
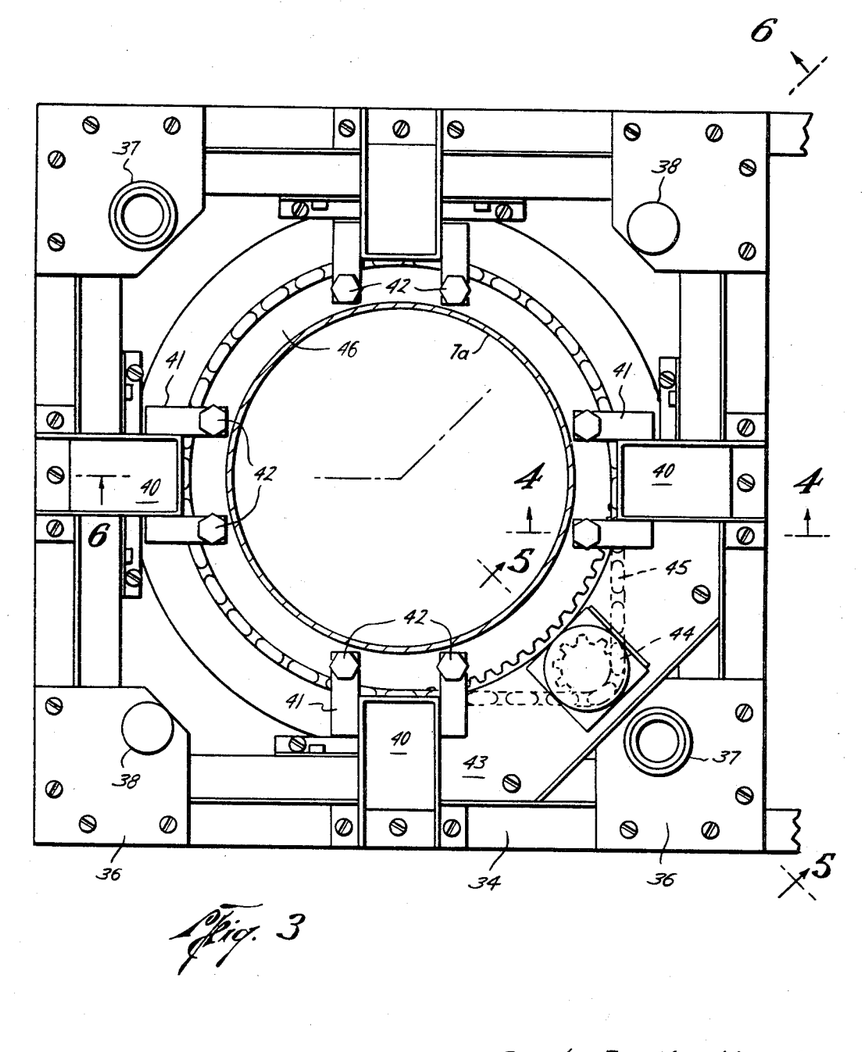
FIGURE 3 is a cross sectional end view of the head control taken on the line 3—3 of FIGURE 1.
Figure 4:
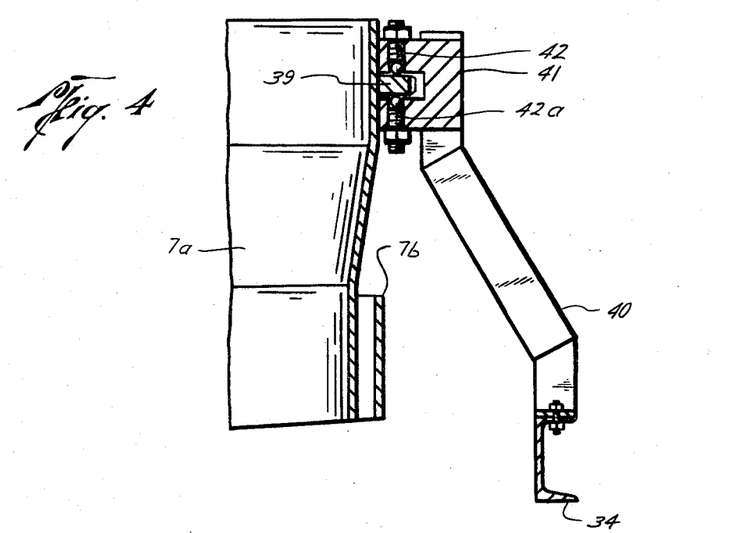
FIGURE 4 is a fragmentary side elevational view, partially in cross section, taken on the line 4—4 of FIGURE 3.
Figure 5:
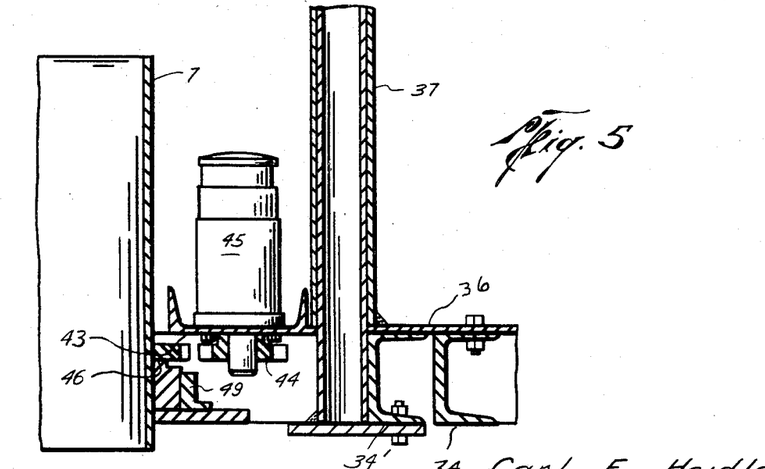
FIGURE 5 is a cross sectional elevational view taken on the line 5—5 of FIGURE 3.
Figures 6, 7:
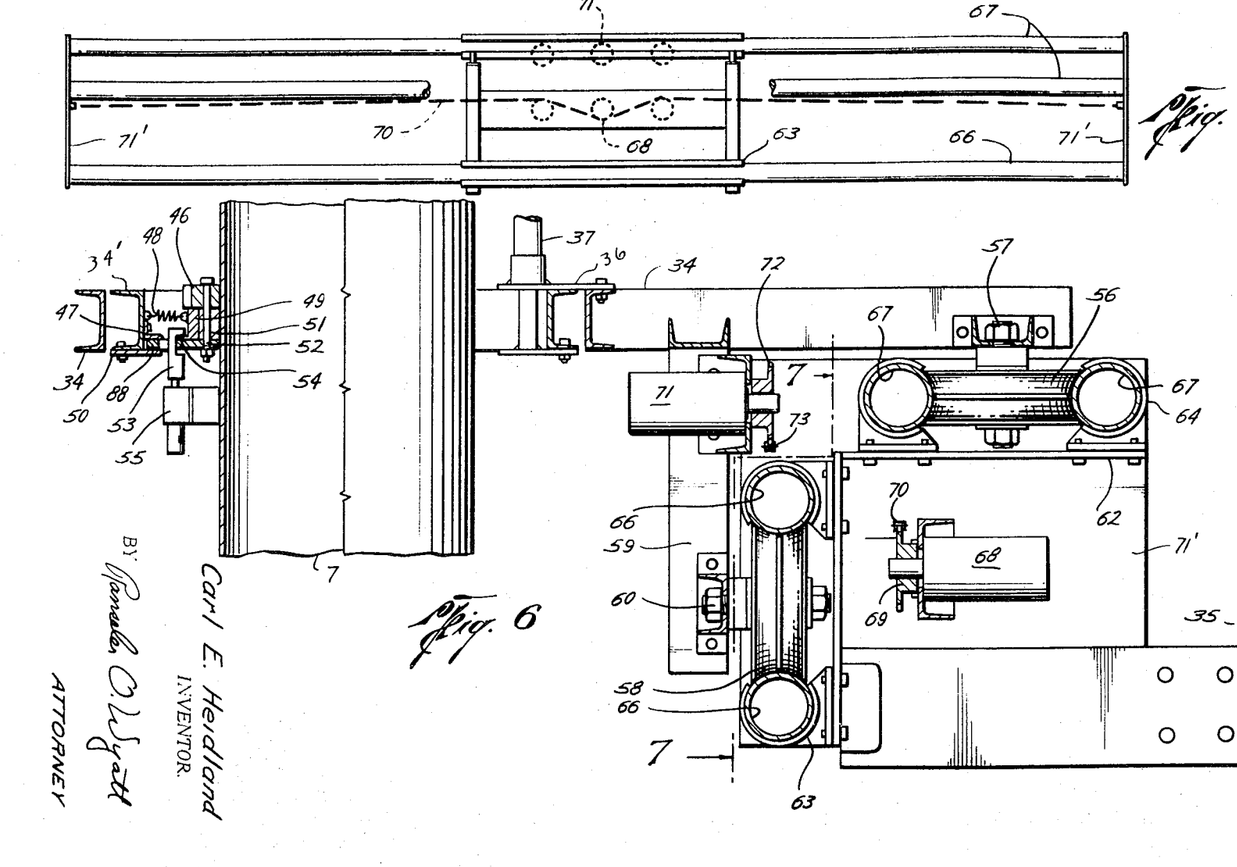
FIGURE 6 is a cross sectional elevational view taken on the line 6—6 of FIGURE 3.
FIGURE 7 is a side elevational view of the head rails taken on the line 7—7 of FIGURE 6.

In the drawings the numeral 1 designates a vehicular framework having a cab 2 and pivotally mounted storage bed 3, such as the usual dump bed, and the auxiliary motor 4, trash separator 5 and air intake means 6. A large conduit 7 leads from the separator 5 over the top of the cab 2 to the picker head 8, the conduit 7 having a horizontal sliding connection 9 which is shown in detail in FIGURE 8, in which the section 9a forms the outer section and 9b telescopes within the section 9a and suitable bearing raceways 10, 10 and bearings 11, 11 are mounted on the section 9b with the bearings 11, 11 in contact with the section 9a. Slip rings 12, 12 are mounted between the telescoping sections 9a and 9b. An expandable packing ring 13 seals the area between the sections and is adjustable through the clamping mechanism comprising the bearing rings 14 in contact with the seal retainer ring 15 and maintained in place by the bolt 16 through the slip ring 17 and on which a suitable lock nut as 18 is mounted. The head 20 of the bolt 16 may be shaped to receive an Allen wrench to rotate the bolt 16.

Figures 8, 9, 10:
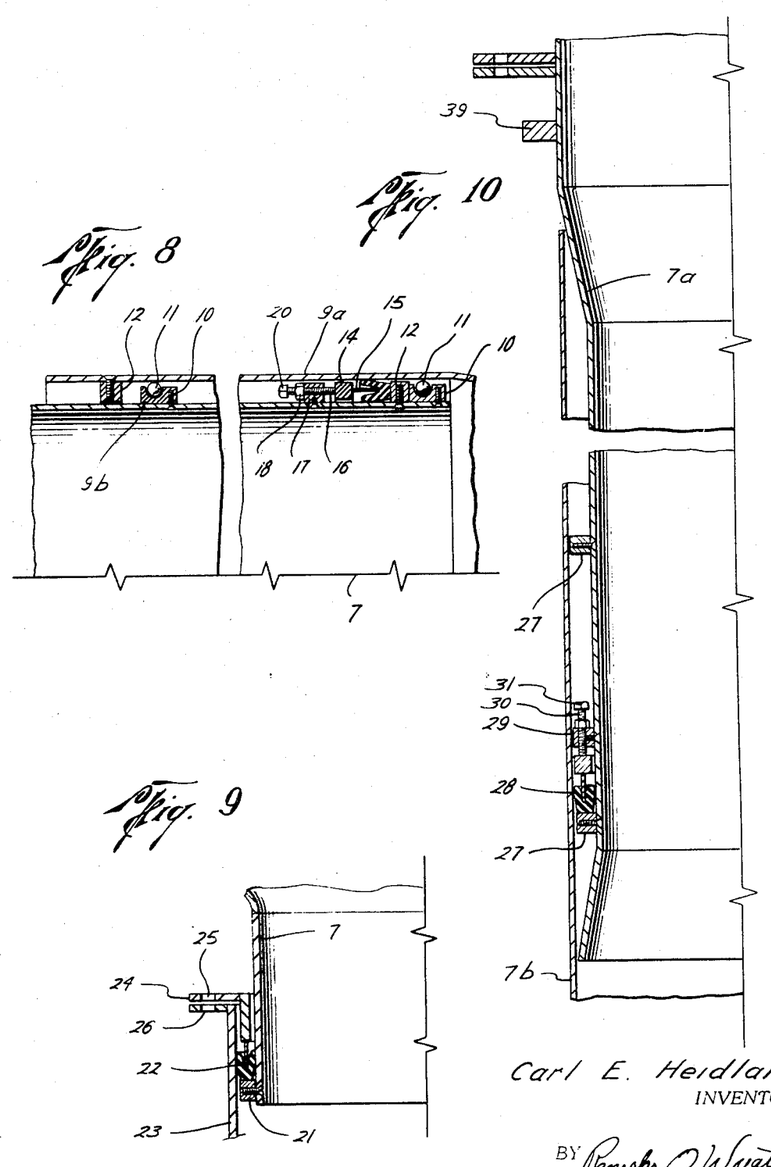
FIGURE 8 is a cross sectional front elevational view of the trash conduit taken on the line 8—8 of FIGURE 1.
FIGURE 9 is a cross sectional side elevational view taken on the line 9—9 of FIGURE 1.
FIGURE 10 is a cross sectional side elevational view taken on the line 10—10 of FIGURE 1.
Figure 11:
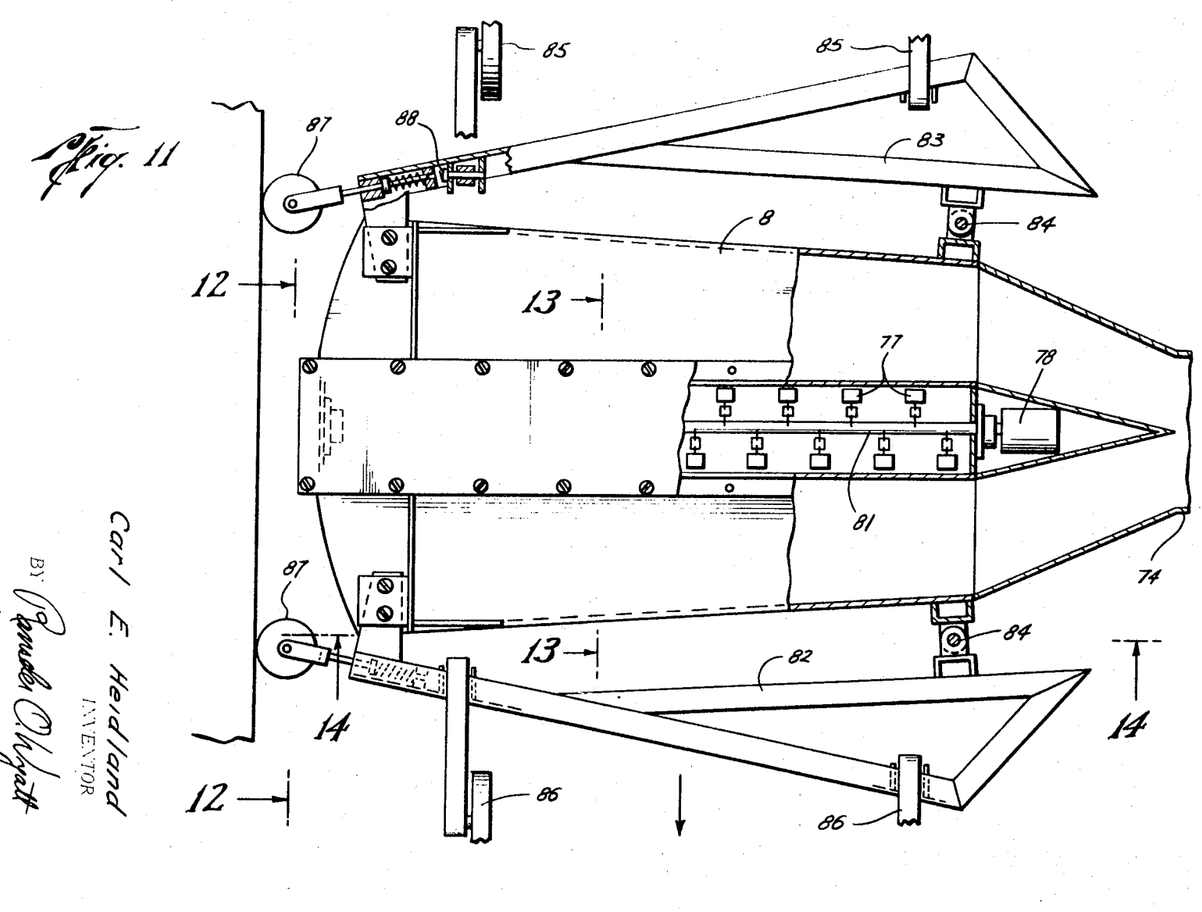
FIGURE 11 is a top plan view of the head, partially in cross section, and with a portion of the case cover broken away.
Figure 12:
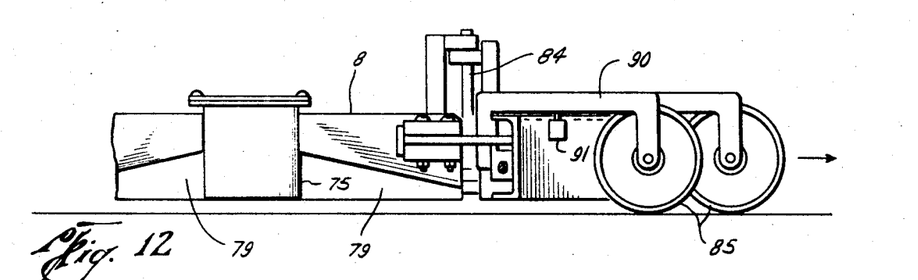
FIGURE 12 is a side elevational view of the head, taken on the line 12—12 of FIGURE 11.
Figure 13:
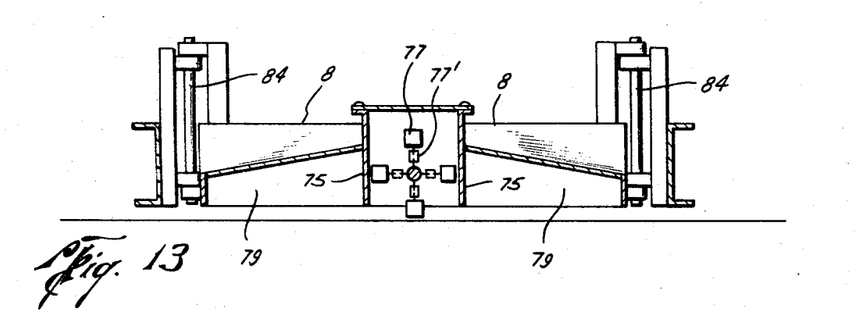
FIGURE 13 is a side elevational view, in cross section, of the head, taken on the line 13—13 of FIGURE 11.
Figure 14:
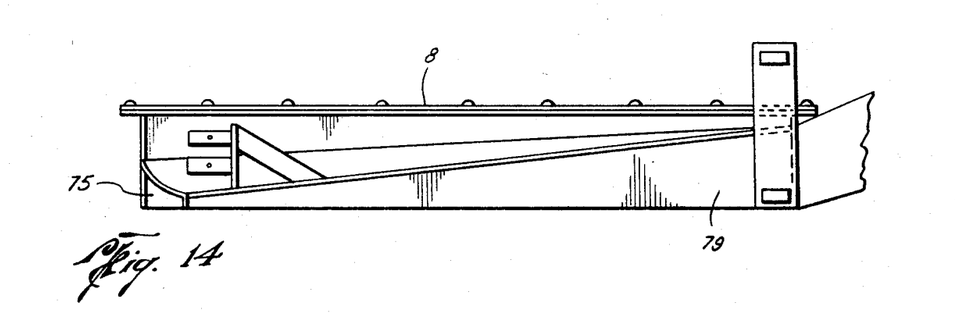
FIGURE 14 is a cross sectional end view of the head, taken from the opposite end of the FIGURE 13 illustration and taken on the line 14—14 of FIGURE 11.
Figure 15:
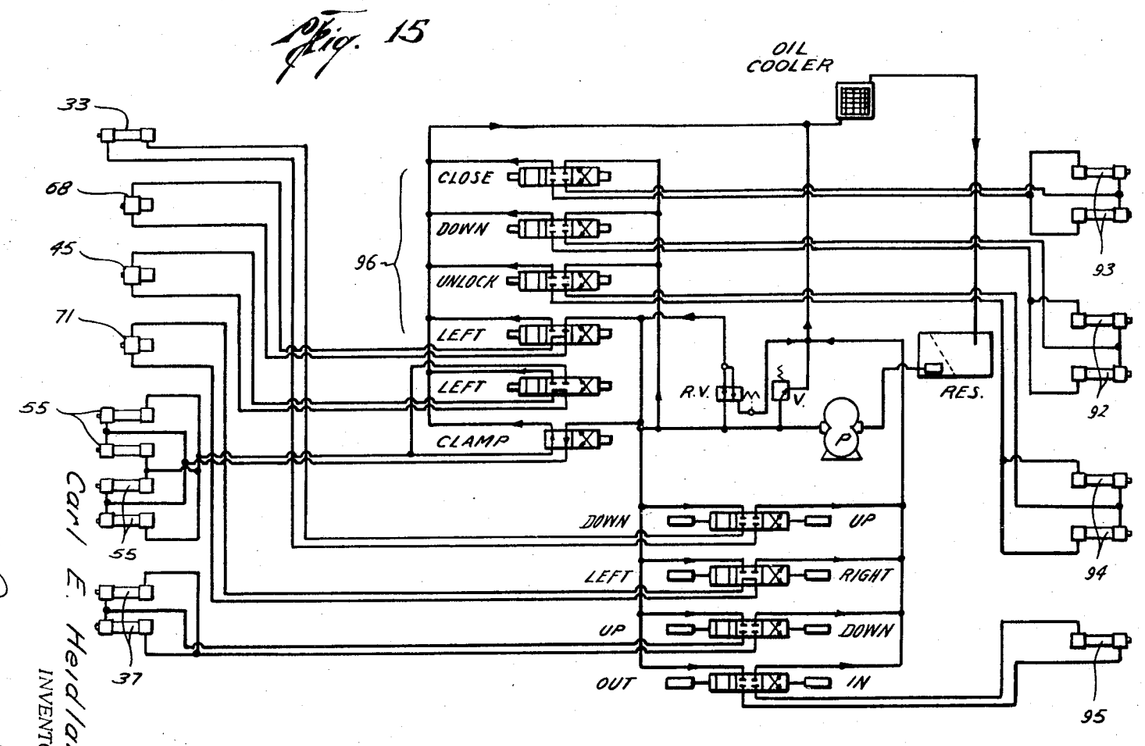
FIGURE 15 is a diagrammatic sketch of the hydraulic means employed.

The connection of the conduit 7 into the separator 5 is rotatable, as shown in FIGURE 9 of the drawings, with the slip ring 21 maintaining the expandable seal ring 22 between the conduit 7 and the intake 23 of the separator 5 and the annular seal ring gland 24 maintains the seal ring 22 in sealing relation between the conduit 7 and the intake 23, there being suitable bolt holes 25, 26 in the annular flanges of said intake 23 and gland 24 to anchor the gland 24 in position.

Conduit 7 is movable vertically and rotatable through the connection shown in FIGURE 10 of the drawings. With the section 7a telescoping in the section 7b, slip rings 27, 27 being mounted in the section 7a between the two sections, and the expandable packer ring 28 and expanding mechanism consisting of the slip ring 29 mounted on the section 7a and the rotatable bolt 30 extending longitudinally therethrough having the lock nut 31 and Allen head cap 32. The section 7a may move vertically in the section 7b between the slip rings 27, 27 and may rotate within the section 7b.

The section 7b has the flexible elbow 32 and the head 8 is connected at the other end of said elbow. A hydraulic ram 33 is mounted between the section 7b and the head 8, and is controlled by a valve actuated by the switch SW-1, and which raises and lowers the section 7b.

The head 8 is mounted on the head support within the carriage, said carriage consisting of the framework formed of beams 34, 34 and plates 36, 36 which reinforce the beams 34. Inner framework beams 34' are anchored to the outside members of the telescoping hydraulic cylinders 37, 37 which are a part of the ram jets 38, 38 provided to move the head and conduit 7 vertically with relation to the framework 34. An annular flange 39' is mounted on the conduit 7a and is supported rotatably by four sets of brackets as 40, 40 which are secured at one end to the framework 34 and are provided at the other end with the bearing supports 41 and adjustable bearings 42, 42 and 42a, 42a which bear against the upper and lower surfaces respectively of the flange 39'. A motor support 43 is mounted on the framework 34' and a motor 44 is mounted on said motor support. A chain 45 extends around the conduit 7 and is mounted on the lugs 46 and the conduit 7 is rotated selectively by said motor 44.

An annular plate 50 is anchored to the framework 34' with the adjustable guide 47 secured to the said framework 34' in position to clear the top surface of the flange 88 mounted on the conduit section 7a and providing a track for the flange. A series of springs, as 48, extend around the conduit 7 and are anchored at one end to the framework 34' and at the other end to the clamp ring 49. Preferably four of these springs are evenly spaced around the conduit 7. An annular support 51 is mounted on the section 7a immediately beneath the sprockets 46 and an anchoring device, such as the rivets 52, extend through the sprocket 46, through the support 51 and through the plate 88. The clamp ring 49 is mounted between the sprockets 46 and the plate 88 and a clamping member 53 extends through the plate 88 and overlaps the outwardly turned margin 54 of the clamp ring 49. A hydraulic ram 55 operates the clamp member 53, and when the clamp member 53 is released, the conduit 7 may rotate freely; when the clamp member is applied, the conduit 7 will still rotate, but will be constantly urged into the clamping position by the springs 48, so that after the head has swung out away from an obstacle, it will be immediately returned to starting position by these springs 48.

The framework 34 is anchored to the wheel 56 by means of the bolts 57 and to the wheel 58 by means of the channel iron frame 59 and the bolt 60. The plates 61, 62 supporting the rail guides 63, 63, 64, 64 are mounted on the vehicle framework 35. Elongated horizontal rails 66, 66 are mounted in the guides 63 and the rails 67, 67 are mounted in the guides 64. A motor 68 mounted on the frame plate 62, rotates the sprocket 69, which is in mesh with the chain 70, which is anchored at its respective ends to the rail plates 71', 71' mounted on the extended ends of the rails 66, 67. This action will move the rails 66, 67 in the guides 63, 63 to alternately position the rails in the guides and the motor 71 is mounted on the carriage and will rotate the sprocket 72, to move the carriage laterally on the rails 66, the sprocket 72 being in mesh with the chain 73.

The head 8 has the intake passageway 74 and the underside of the head is open, with the dividing partitions 75, 75 providing the chamber 76 which houses the power rake which is activated by the motor 78. The intake of the head 8 is thus divided into two chambers 79, 79. The rake consists of lengths of chain 77, 77 attached to the rotatable shaft 81. Mounted on the front and rear of the head 8 and extending parallel with the longitudinal margin thereof, are the feeler bars 82, 83 which are pivoted at 84, 84 and have the forwardly and rearwardly extending feelers 85, 85, 86, 86 respectively. Mounted on the end of the head 8, opposite the intake end, are yieldably mounted feelers 87, 87.

As the machine moves along a street, with the feelers 87 touching a curb, and an obstruction is encountered, the contacting feeler will move inwardly against the switch 88 which will activate the head rotating motor and the head will swing away from the obstruction. With the feelers 85, 86 an obstacle is similarly detected by the advance feeler and will be lifted, raising the feeler arm 90 off of the switch 91, which will activate the elevating cylinders 37 and lift the head out of the way of the obstruction. The action of the switches 88 and 91 is momentary, and the head will swing back into set position, however, if the obstruction is still in the way of the head 8, and one of the feelers, or the feeler bars, contacts the obstruction, the retraction of the head will be repeated.

The bed of the truck is equipped with a hydraulic ram 92 for raising and lowering the dump body, and with a ram 93 for the trap drop (not shown) for releasing debris within the separator 5, and a ram 94 is provided for locking and unlocking the door 3 and the ram 95 is provided for operation of the clutch of the auxiliary motor 4. The valves 96, 96 reverse the hydraulic flow and the manually operable controls therefor are mounted on a control panel in the cab 2.

Figure 16:
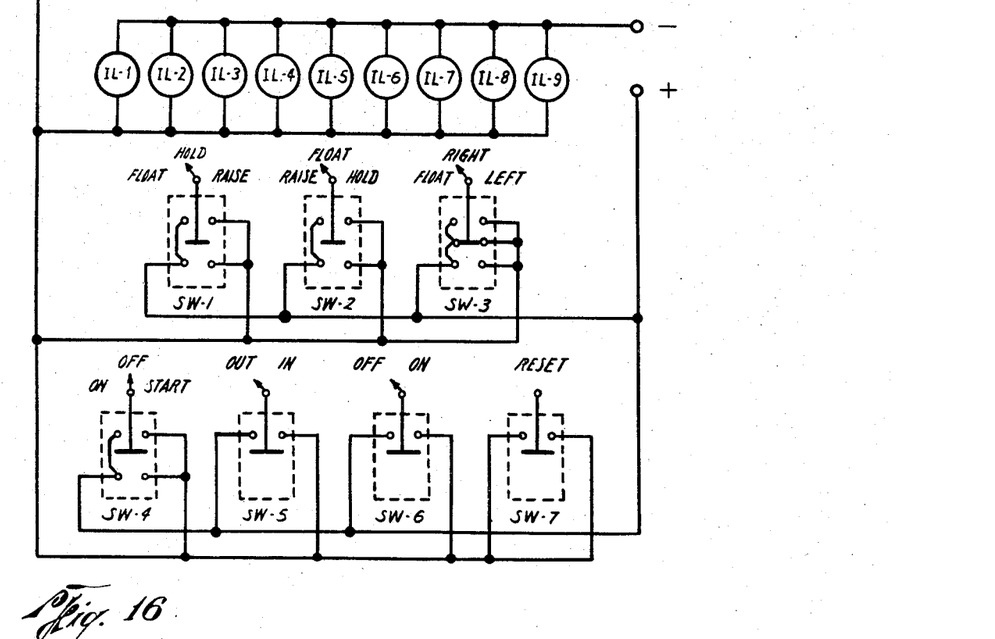
FIGURE 16 is a schematic view of the electrical system employed, showing the console arrangement to be located inside the cab of the vehicle.
Figure 17:
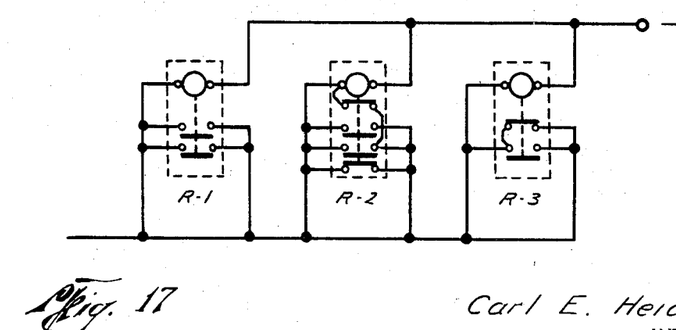
FIGURE 17 is an electrical schematic of the relays employed.
Figure 18:
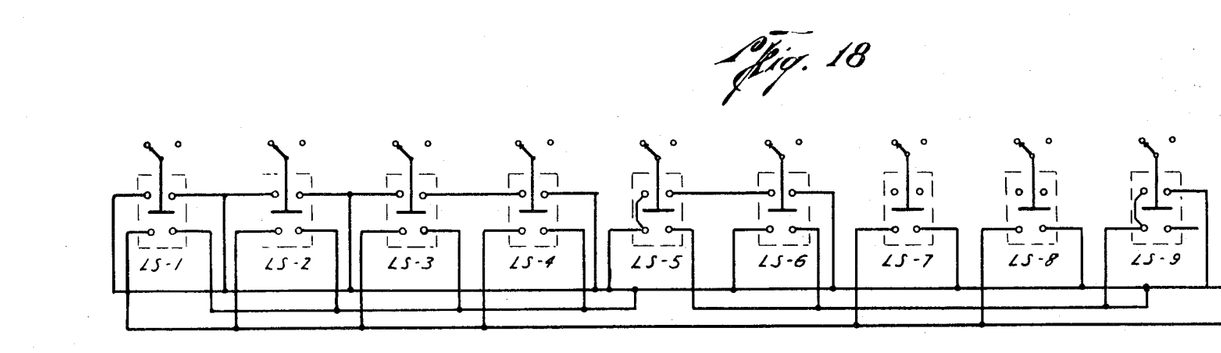
FIGURE 18 is an electrical schematic of the head mounted switches.
Figure 19:
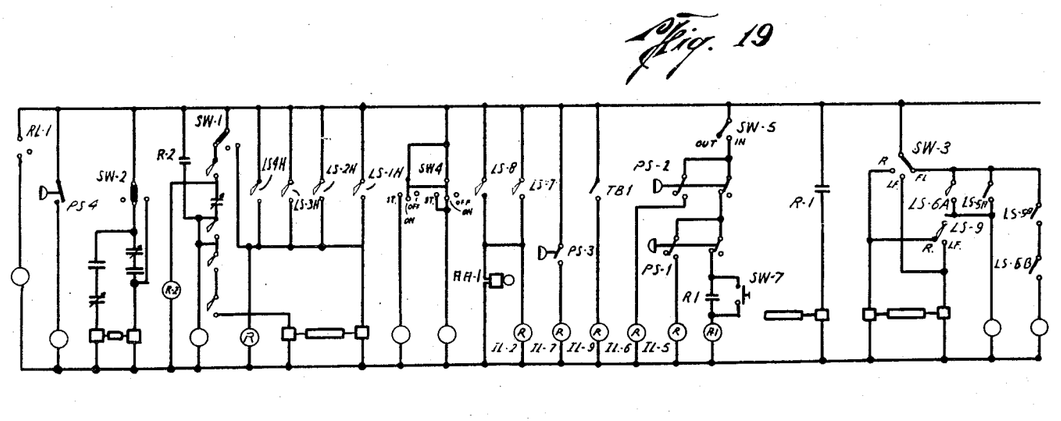
FIGURE 19 is an electrical schematic of the control panel.

The electrical circuits employed are illustrated in FIGURES 16 through 19. In FIGURE 16, the console to be located in the cab 2 is shown. In this console the signal lights indicate the various functions of the device, the light IL–1 illuminating in red when the head is being elevated. If the head does not clear an obstruction after elevation and the obstruction contacts a guard rail as 82 or 83, the audible alarm AA–1 will be activated and the light IL–4 will light up. In the event the separator becomes overloaded, the vacuum switch PS–1 will open and the light IL–5 will glow. Similarly when the dump bed is overloaded, the switch SW–5 will open and the signal light IL–6 will glow. In both clogging instances, the clutch of the motor 4 will be disengaged. Reset switch SW–7 may be employed to reset the clutch. When the head 8 moves too close to an obstruction, and the feelers 85, 86 signal the motor 71 to move the head out of the way, simultaneously the switch SW–3 will close to either the right or left position, depending upon which side of the truck the carriage is operating, and the cylinder 37 will be actuated and circuit will be completed through the light IL–3. When the travel is normal, the light IL–2 will glow yellow, with the switch SW–3 closed on the "float" position.

The switches on the schematic drawing for the electrical circuits designated thereon as LS–1 through LS–4 are the attitude detection switches, such as 88 and 91 and the guard rail alarm switches are designated as LS–5 and LS–6. The head location switches are designated as LS–7 and LS–8 and the head position switch is designated as LS–9. The head elevation switch is designated as SW–1; the head tilt switch as SW–2; the carriage positioning switch as SW–3; the motor ignition switch as SW–4; the clutch switch as SW–5; the running light switches as RL–1; the clutch reset switch as SW–7. The relays are designated as: the head tilt R–2; also R–3; the clutch lock out as R–1; the blower which generates the vacuum on the head is controlled through the vacuum switch PS–1; the blower also has the pressure switch PS–2 which is actuated by high pressure over a preselected degree; an oil pressure switch PS–3 is provided which is actuated by low hydraulic pressure and the motor 4 has the pressure switch PS–4 which is actuated by low oil pressure; the motor 4 also has the temperature switch TS–1 which is actuated by high water temperature in the motor 4; the respective indicator lights are numbered from IL–1 through IL–11; there is a guard rail alarm indicated by AA–1 and the head has the head lock pressure switch PS–5 which is actuated by hydraulic pressure to lock the cylinder.

In operation, the device will be actuated by starting the motor 4 and positioning the head by releasing the clamp 53 and rotating the head to the desired position through the motor 44, adjusting the tilt as well as the position of the rails and the position of the carriage on the rails. The clamp 53 is again applied and the head is yieldably maintained in the clamped position. The elevating switch SW-1 may be then moved to "float" position and the head will be automatically lowered until the feelers 85 contact the surface to be cleaned, which will release the switch 91 and hold the head at that position vertically, and the springs 48 will hold the head yieldably in the preselected position, rotatably. If the operator wishes to maintain the head in this position rather than permit the feelers 85 to control the vertical position of the head, he may move the switch SW-1 to "hold" position. The tilt of the head is determined by the cylinder 33, which, when switch SW-2 is set on "float" will automatically be adjusted to control in alignment with the contour of the surface being cleaned, but which may be manually moved through the switch SW-2 to a desired position, and maintained there by placing the switch on "hold."

The vacuum through the head 8 which will draw debris through the head and the conduit 7, into the separator 5 and into the dump bed from which the excess air may escape through the louver 6, is generated by the blower which in turn is actuated by the auxiliary motor 4. The head 8 is mounted on the carriage at the front of the vehicle and the carriage will be moved to the side of the truck desired for cleaning operations. As the truck moves down the street, the head may be out beyond the curb over the esplanade or shoulder, or to one side of the vehicle front adjacent the curb. The console in the cab 2 will indicate by a red light if the head is too close to the curb, and will alert the operator to the fact that the head is about to be swung out of position, or elevated, and if the head is free of the curb, the yellow light will glow thus advising the operator relative to the head position with relation to the curb. The operator controls the movement of the vehicle and the vacuum head picks up the debris, and particularly on the pavement, where packed debris is encountered, the rake 77 may be actuated, the shaft 81 rotating at high speed and the chains 77' yieldably striking the debris to loosen same, so that the loose debris preceding the rake will be picked up by one section of the head, the packed debris loosened by the rake, and then picked up by the other section of the head.

The feeler wheels 86, 87 will guide the head, and so long as the operation is normal, the yellow light on the console will glow. When the feelers 86, 87 encounter an obstacle, the red signal will glow and the motor 44 will be activated, swinging the head away from the obstacle by rotating the head or if the feelers 85 or 86 are contacted, switch SW-3 will close, elevating the head. This activates the valve reversing the hydraulic flow to the cylinders 37 momentarily, and when the obstacle is passed, during normal movement, the springs 48 will rotate the head to its pre-set position and the cylinders 37 will return to float position. If the operator wants to maintain the head in any desired position, he may move the switch SW-1 to "hold."

When the motor 4 is first started, the light indicating the temperature and pressure, IL-9 and IL-7 respectively, will glow. When the motor 4 has warmed up and the temperature and pressure are normal, the lights will go out.

The hydraulic pump being driven by the motor 4, will similarly signal a normal pressure through PS-3 and the light IL-7 going out when the pressure is normal. After the engine 4 is warm, the control of the clutch switch SW-5 is moved to "in" position, and the blower (not shown) will be activated. To rotate the head, the head clamp 53 is released by moving the valve MV-2 to "release" position then the head rotation valve MV-1 is moved either to the right or left position, as desired. When the head reaches the position desired, the head rotation valve is released, which stops its movement, and the head clamping valve is moved to "clamp" position. To extend the head to the right or left, the switch SW-3 is moved to the right or left, as desired. When the head is in the desired position, the switch is released, and the head movement will stop. The switches SW-1 and SW-2 will be moved to "float" position, which will cause the head to move automatically to the optimum elevation and inclination.

In cleaning grassy, sodded or graveled surfaces, the clutch switch SW-5 is moved to "out" position and the head tilt switch SW-2 to "float" position, and the head elevation switch SW-1 also moved to "float" position. When the head aligns itself, with respect to the contour to be cleaned, the head elevation switch is moved to "raise" and the head is elevated about two inches off the surface to be cleaned, and the switch then moved to "hold" to stop the elevation. The motor 4 may then be accelerated and the truck moved forward and the cleaning operation commenced. The trap on the separator 5 may be emptied by moving the valve MV-4 to "dump" position, and when emptied, the valve may be moved to "close" position to make the separator again ready for operation. Similarly the bed of the truck may be emptied by unlocking the door through the valve MV-5 and raising or lowering said bed through the valve MV-6. The bed door may be locked by moving the valve MV-6 to the "lock" position.

What I claim is:

1. In a vehicular roadway cleaner, a vehicle, a dump bed mounted on said vehicle, an auxiliary engine mounted on said vehicle, means for generating a vacuum pressure actuated by said engine, a vacuum head on said vehicle, a conduit leading from said vacuum generating means to said head, said head being mounted on a head support, and said head support being mounted on the front of said vehicle and being movable laterally on said vehicle to a selected position on either side of said vehicle and being movable vertically with relation to said vehicle, means whereby said head and head support movement may be automatically and manually accomplished, said device having an hydraulic system powered by said engine and an electrical system having switches and solenoids for actuating the valves of said hydraulic system for controlling the circuits of the electrical system and detecting means mounted on said vehicle for selectively actuating said switches.

References Cited

UNITED STATES PATENTS

| 2,803,847 | 8/1957 | Hobbs | 15—340 X |
| 2,830,510 | 4/1958 | Mariani et al. | 15—340 X |
| 3,004,279 | 10/1961 | Ringer | 15—340 |
| 3,348,258 | 10/1967 | Daneman | 15—340 X |
| 3,229,320 | 1/1966 | Cymara | 15—83 X |
| 3,406,424 | 10/1968 | Rush | 15—340 |

FOREIGN PATENTS

| 141,171 | 5/1951 | Australia. |
| 847,709 | 9/1960 | Great Britain. |

ROBERT W. MICHELL, Primary Examiner

U.S. Cl. X.R.

15—340